US011906120B2

(12) United States Patent
Wang et al.

(10) Patent No.: US 11,906,120 B2
(45) Date of Patent: Feb. 20, 2024

(54) HYBRID FUNCTION LED AUXILIARY LAMP FOR MOTOR VEHICLES

(71) Applicant: Lumileds LLC, San Jose, CA (US)

(72) Inventors: Junxin Wang, Jieyang (CN); Jiangliang Wang, Shanghai (CN); Dongdong Wei, Shanghai (CN); Chen Cai, Shanghai (CN)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 17/880,564

(22) Filed: Aug. 3, 2022

(65) Prior Publication Data

US 2024/0003509 A1 Jan. 4, 2024

(51) Int. Cl.

| | |
|---|---|
| ***F21S 41/32*** | (2018.01) |
| ***F21S 41/148*** | (2018.01) |
| ***F21V 21/30*** | (2006.01) |
| ***F21S 41/20*** | (2018.01) |

(52) U.S. Cl.

CPC ............. *F21S 41/148* (2018.01); *F21S 41/28* (2018.01); *F21S 41/321* (2018.01); *F21V 21/30* (2013.01)

(58) Field of Classification Search

CPC ...... F21S 41/148; F21S 41/321; F21S 41/323; F21S 41/33; F21S 41/332; F21S 41/333; F21S 41/331; F21S 41/334; F21S 41/335; F21S 41/336; F21S 41/337; F21S 41/338; F21V 13/10; F21V 7/0066; F21V 7/0083

See application file for complete search history.

(56) References Cited

U.S. PATENT DOCUMENTS

| | | | | |
|---|---|---|---|---|
| 2017/0159902 | A1* | 6/2017 | Yamamoto ............ | F21S 41/663 |
| 2018/0142859 | A1 | 5/2018 | Watanabe | |
| 2019/0041024 | A1 | 2/2019 | Yamaguchi et al. | |

FOREIGN PATENT DOCUMENTS

| | | | |
|---|---|---|---|
| CN | 107461699 | A | 12/2017 |
| CN | 215411718 | | 1/2022 |
| CN | 216010708 | | 3/2022 |
| FR | 3086033 | A1 | 3/2020 |

OTHER PUBLICATIONS

UN Regulation No. 148—Light Signalling Devices (LSD), E/ECE/TRANS/505/Rev.3/Add.147 (Jan. 9, 2020).

UN Regulation No. 149—Road Illumination Devices (RID), E/ECE/TRANS/505/Rev.3/Add.148 (Jan. 13, 2020).

International Search Report and Written Opinion dated Sep. 28, 2023 for PCT International Application No. PCT/US2023/026709.

* cited by examiner

*Primary Examiner* — Omar Rojas Cadima

(74) *Attorney, Agent, or Firm* — Volpe Koenig

(57) ABSTRACT

A hybrid function LED auxiliary lamp is provided. The auxiliary lamp comprises a housing and a lighting assembly disposed within the housing. The lighting assembly includes a plurality of LED light sources mounted on a printed circuit board. An optical manifold comprising a plurality of reflective cavities is mounted on the printed circuit board. Each reflective cavity defines a respective corresponding focal point. The LED light sources are aligned with respect to the optical manifold such that a center of each respective LED light source corresponds to a respective focal point of a reflective cavity.

12 Claims, 8 Drawing Sheets

HYBRID FUNCTION LED AUXILIARY LAMP FOR MOTOR VEHICLES

CROSS REFERENCE TO RELATED APPLICATION

This application claims priority to PCT/CN2022/103680, filed Jul. 4, 2022 which is incorporated by reference as if fully set forth.

BACKGROUND

Proper vehicle lights, including headlights, taillights, and auxiliary lighting, improve safety, enhance cosmetic appearance and functionality and versatility to a vehicle. For example, auxiliary lights work in conjunction with stock lights to deliver added visibility in certain complex conditions. Auxiliary lights include fog lights, driving lights, off-road lights and the like. Auxiliary lighting is tailored for optimal visibility in poor weather conditions such as rain, fog, or mist, or anywhere additional lighting may be needed for safe driving. For example, unlike regular lights, which reflect light from water droplets in the air back into a drivers eyes, fog lights minimize the amount of return glare. This is accomplished by creating a wider, lower light beam that projects downward onto the road. On the other hand, road illumination lights are designed to provide visibility of objects at greater distances in front of a vehicle. When used in conjunction with regular lights, driving lights allow a driver to see further down the road. However, to prevent blinding oncoming motorists, regulatory agencies may specify configurations for such lights in terms of, e.g., height at which the lights should be mounted with respect to the ground, beam angle and other parameters. It would be desirable to have a hybrid lighting assembly that could provide all of the above functions and that could also be configured to meet applicable local regulations.

SUMMARY

A hybrid function LED auxiliary lamp is provided. The auxiliary lamp comprises a housing and a lighting assembly disposed within the housing. The lighting assembly includes a plurality of LED light sources mounted on a printed circuit board. An optical manifold defining a plurality of reflective cavities is mounted on the printed circuit board. Each reflective cavity is formed to define a respective corresponding focal point. The LED light sources are aligned with respect to the optical manifold such that a center of each respective LED light source corresponds to a respective focal point of a reflective cavity.

BRIEF DESCRIPTION OF THE DRAWINGS

A more detailed understanding can be had from the following description, given by way of example in conjunction with the accompanying drawings wherein.

DETAILED DESCRIPTION

Figure 1A:
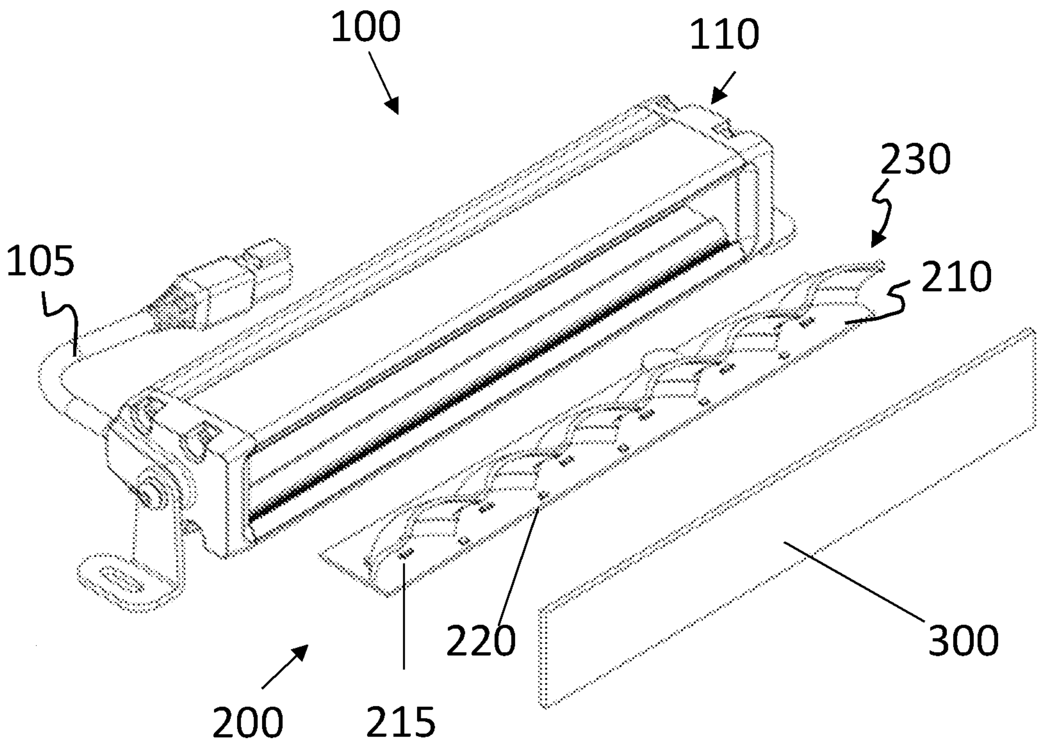
FIG. 1A is an exploded view of a hybrid function auxiliary lamp assembly according to the disclosure.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Automobile headlights perform two basic functions. One function is to illuminate the road and objects in the direction of the vehicle's movement. Vehicle lights that perform this function include driving beam headlamps, passing beam headlamps, front fog lamps, cornering fog lamps and the like. The second function is a signaling function, i.e., to provide visible signals that convey information useful to other road users. For example, information on the presence, identification and/or the change of movement of the vehicle.

Vehicle lights that perform a signaling function include position lamps, parking lamps, daytime running lamps and the like.

Automotive lamps generally comprise three different types of systems. These are electrical systems, optical systems and mechanical systems. An electrical system typically includes LED modules and electronically controlled gears to control the light sources. An optical system comprises a reflector with reflective properties and/or a lens with refractive properties. The mechanical system comprises lamp body parts and outer lens parts for heat dissipation and protection. These systems can be combined to form an automotive auxiliary lamp which can be powered by a vehicle's DC power supply.

As driving applications increase in complexity, automotive auxiliary lamps will be called upon to perform both road illumination functions and signaling functions to cope with every increasing illumination and signaling demands. However, existing automotive lamps are typically separated by function. Automotive lamps that perform road illumination functions usually comprise one or more groups of corresponding independent optical parts and LED modules. They may also use printed circuit board assemblies independent and separate from the PCBAs used by automotive signaling lamps. These assemblies may themselves be divided into multiple groups of light elements, with different groups performing different functions.

As a result of the physical and functional segregation of automotive lamps the number of optical parts, LED modules, fastener connection devices and process flows required to produce automotive lighting assemblies increases as the lighting performance demands increase. This results in high costs for Research and Development (R&D), manufacturing, and operation. At the same time, increases in complexity of the luminaire present a challenge to luminaire reliability.

In response to the above problems, attempts have been made to reduce the number of optical parts required to implement diverse lighting functions. For example, CN 215411718 U discloses a multifunctional light distribution structure of a lamp, which includes a casing, a light-transmitting cover, an illumination light source module and an indication light source module. The indication light source module includes a lens and a plurality of indicator LEDs. This has the advantages of universal applicability and a capability to emit different functional light shapes.

As another example, CN 216010708 U discloses a lens lamp, which includes a bottom case, a lamp board, several lamp LEDs with different functions, and a PC lens with non-direct total reflection. This has advantages of good versatility of choice of product materials and convenient assembly. These approaches reduce the number of optical parts that realize a given light-signaling function and affords more versatility in selection of parts. However, the light-signaling function still relies on independent optical parts for its implementation. There is more to be achieved when it comes to reducing the number of parts and the cost of vehicle lighting assemblies as well as addressing the performance reliability challenges.

FIG. 1A is an exploded view of a hybrid function light emitting diode (LED) auxiliary lamp 100 for a motor vehicle. Auxiliary lamp 100 performs a road illumination function as well as a light-signaling function. Auxiliary lamp 100 comprises a housing 110, an integrated lighting assembly 200 and an outer lens 300. Housing 110 provides a lamp body to support lighting assembly 200 and electrical wiring 105 to deliver power to lighting assembly 200. Lens 300 is configured to transmit light and also acts as a protective barrier against external contaminants. Integrated lighting subassembly 200 includes an optical manifold 230, a plurality of road illumination LED modules 215 and a plurality of light signaling LED modules 220 mounted on a single printed circuit board assembly (PCBA) 210. Subassembly 200 integrates LED light sources and optical components that perform road lighting functions with LED light sources and optical components that perform light signaling functions. Advantageously, optical manifold 230 of lighting assembly 200 integrates optical reflector components configured to implement light signaling functions and optical reflector components configured to implement road illumination functions. LED road illumination lighting elements 215 are disposed on PCB 210 along with LED signaling lighting elements 220.

Figure 1B:
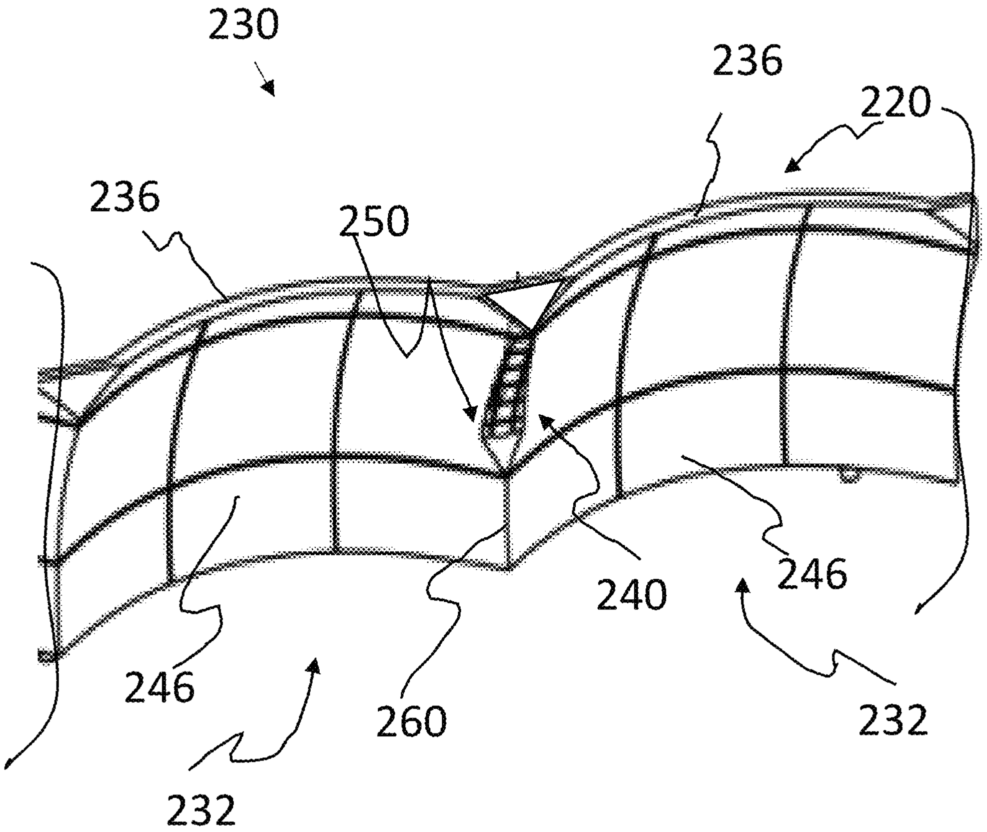
FIG. 1B is an enlarged view of a portion of the example optical manifold illustrated in FIG. 1A.

FIG. 1B is an enlarged view of a portion of optical manifold 230 illustrated in FIG. 1A. Optical manifold 230 comprises a manifold body structure 220 comprising a plurality of curved portions 236, (two shown) each respective curved portion 236 including a corresponding respective reflective inner surface 246. Each curved portion 236 defines a free-form surface reflective cavity, 232. Surface reflective cavities 232 are configured as described herein to implement multiple diverse lighting functions. Optical manifold 230 further includes one or more sets of reflectors 240 which are small in size relative to the size of surface reflective cavities 232. Reflectors 240 are disposed in a light signaling reflective cavity 250 and are configured to support light signaling functions. Relatively larger surface reflective cavities 232 are configured to implement road illumination functions.

As can be seen from FIGS. 1A and 1B, the hybrid function LED automotive auxiliary lamp 100 provided by the disclosure integrates an optical system supporting light-signaling functions into an optical system supporting road illumination functions. In the example auxiliary lamp 100 shown, the same optical manifold 230 is used for both types of auxiliary lighting functions. Compared to conventional LED automotive auxiliary lamps, lamp 100 has fewer components, fewer light-signaling parts, and fewer corresponding fastening assembly parts, etc.

Figure 2:
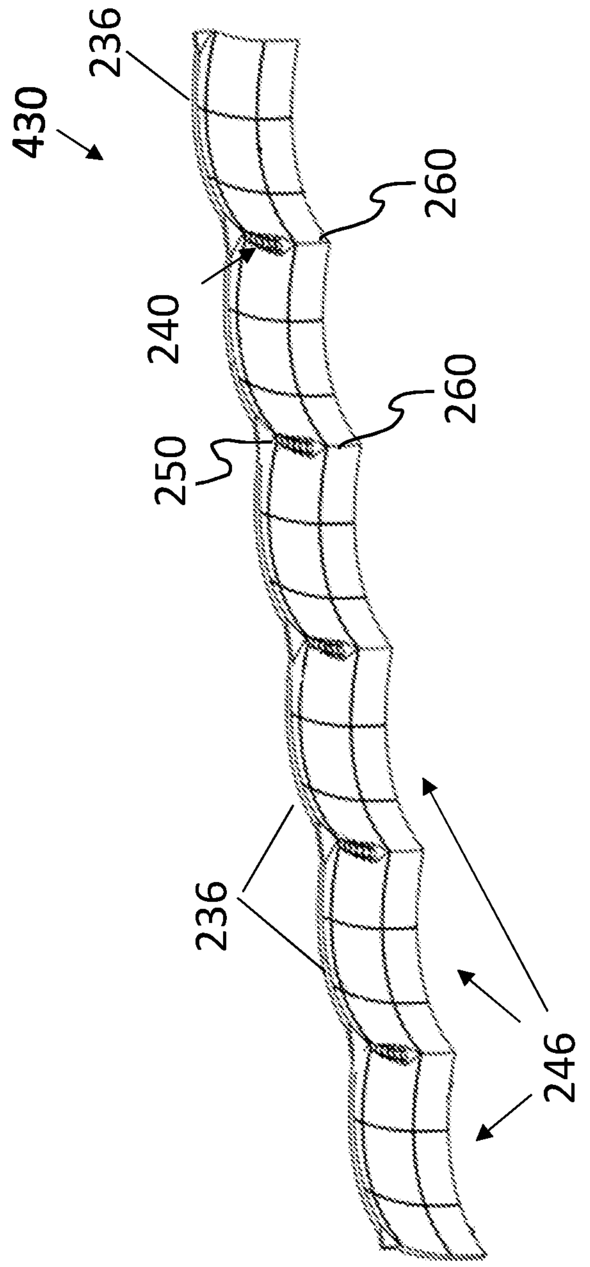
FIG. 2 is a perspective view of an optical manifold according to an example of the disclosure.

FIG. 2 is a perspective view of an example 430 of the optical manifold 230 illustrated in FIGS. 1A and 1B. Optical manifold 430 includes 5 sets of light signaling reflectors 240, each set 240 disposed in a corresponding one of five light signaling reflection cavities 250. Each light signaling reflection cavity 250 is formed at a junction 260 of two road illumination reflection cavities 246. In this position on optical manifold 230, light reflected from reflectors 240 has negligible impact on the light reflected by road illumination reflective cavities 246 to illuminate the road. In the example of FIG. 2 one light set of reflectors 240 disposed in one light signaling reflective cavity 250 is provided for every two light illumination reflective cavities 246 comprising optical manifold 430. Signaling reflective cavity 250 can be formed at every junction 260 of two light illumination reflective cavities 246.

Figure 3A:
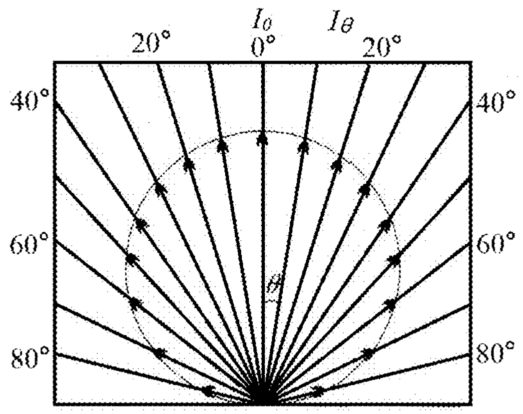
FIG. 3A is a graph illustrating a Lambertian radiation pattern.

In some example embodiments, LED signaling modules 220 (best illustrated in FIG. 1) are configured so as to exhibit near-Lambertian radiation, as shown in FIG. 3A. A radiation pattern describes the relative light strength in any direction from the light source. The apparent brightness of a Lambertian surface to an observer is the same regardless of the observer's angle of view. When LED signaling modules 220 are configured to exhibit a near-Lambertian radiation pattern, the light reflected from reflectors 240 will have almost no effect on the central light intensity output by the LED road illumination modules 215 using road illumination reflective cavities 246. Thus, the light signaling functions do not interfere with the road illumination functions provided by auxiliary lamp 100.

Figure 4:
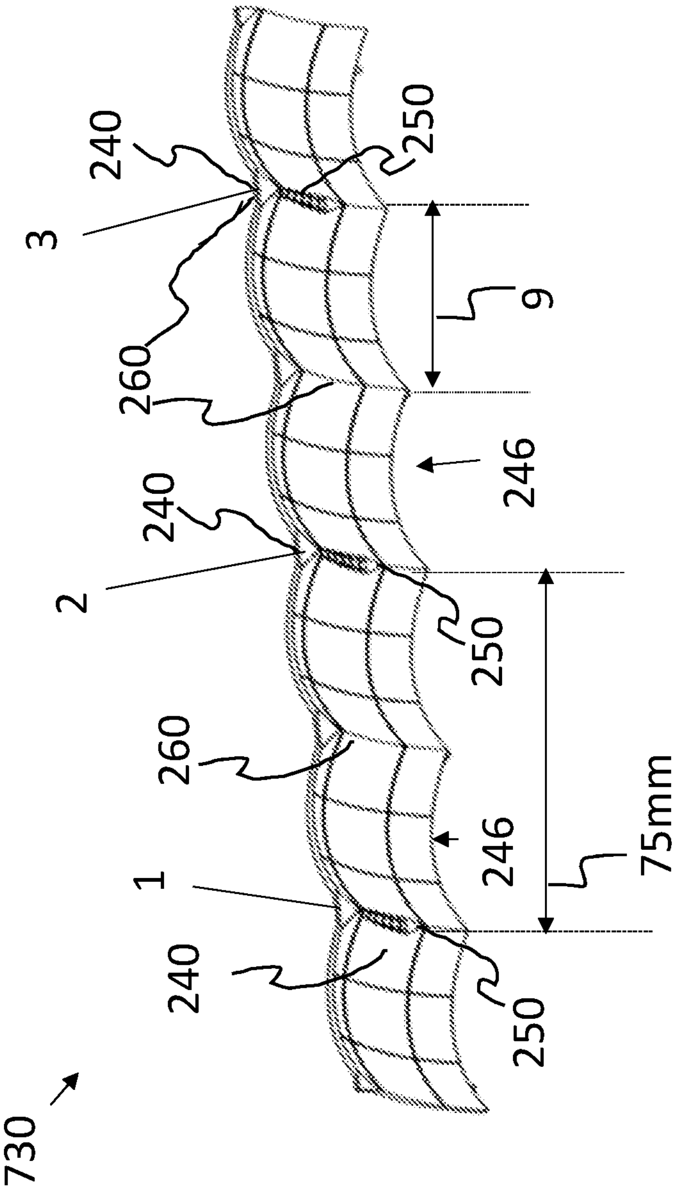
FIG. 4 is a front perspective view of an example of the optical manifold illustrated in FIGS. 2A and 2B.

In some applications it is desirable to have a specified distance between the edges 260 of adjacent road illumination reflective cavities 246 as indicated at 9. Further, in some applications it is desirable to have a specified distance between light signaling reflective cavities 250. In some jurisdictions there are regulations that dictate the separation distance between various vehicle lights. For example, an existing regulation might require vehicle position lights to be separated by no more than 75 mm. In those such applications the optical manifold disclosed herein can be configured accordingly. In the example of FIG. 4 manifold 730 includes reflectors 240 at positions 1, 2 and 3. Reflectors 240 can support light vehicle position light functions. To meet the example regulation above, manifold 730 can be configured so that the separation between reflectors 240, e.g., between reflectors at position 1 and reflectors 240 at position 2 is the specified 75 mm.

Figure 5:
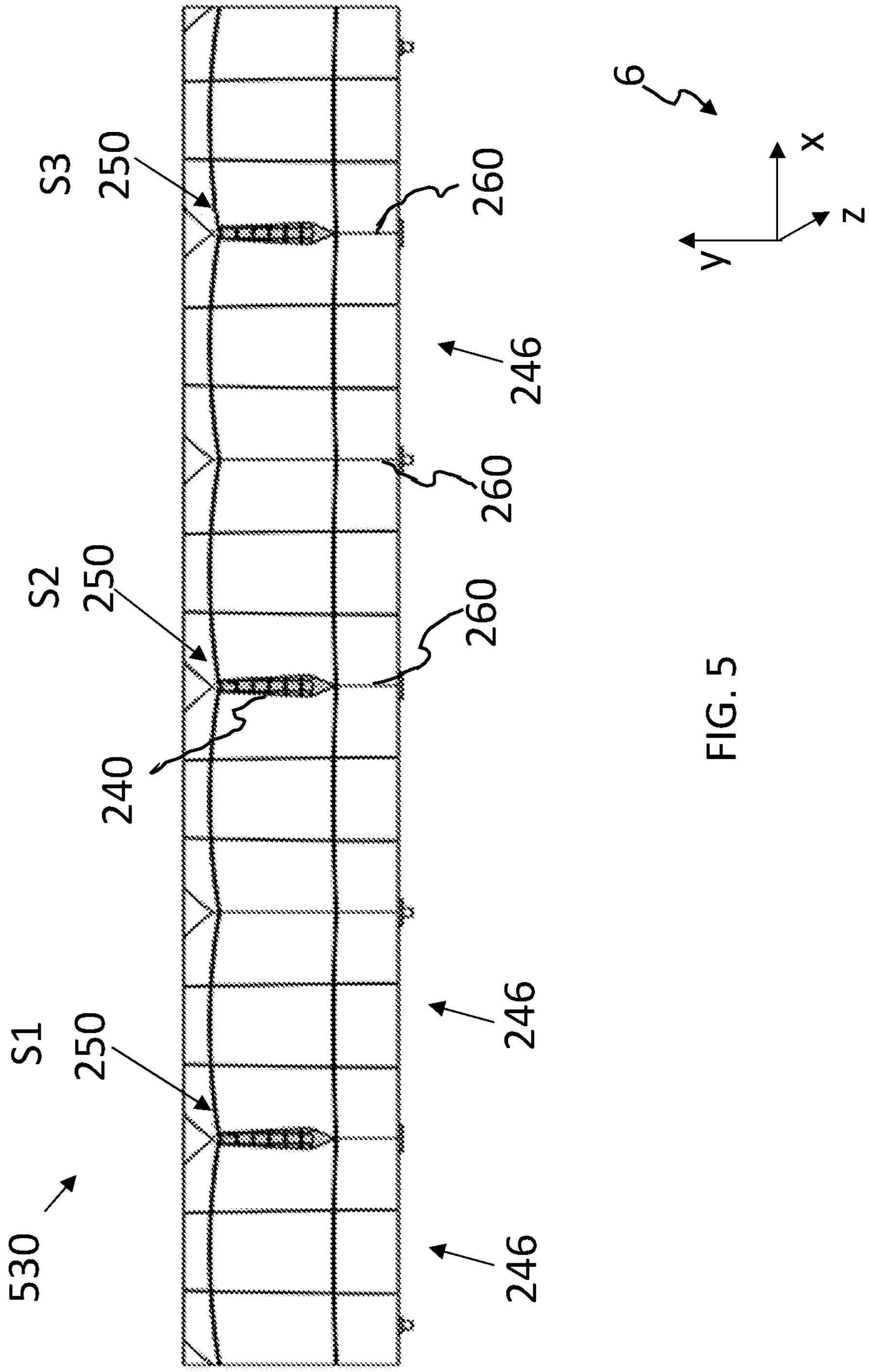
FIG. 5 is a front elevation view of the optical manifold illustrated in FIG. 4.

FIG. 5 is a front elevation view an example optical manifold 530 according to the disclosure. The example of FIG. 5 illustrates an application in which manifold 530 is configured to conform to a regulation. In the example of FIG. 5 the sum of the apparent surface areas of all reflective cavities 250 in the direction of the reference axis of the optical signal function must meet the area range required by regulations. In this example reflectors 240 support a daytime running lamp function. According to the example regulation, the area of the apparent surface in the direction of the axis of reference (z) of the daytime running lamp shall be not less than 25 $cm^2$ and not more than 200 $cm.^2$ As shown in FIG. 5 there are three sets of reflectors 240, each disposed in a corresponding cavity 250, each cavity having a surface area. S1, S2, S3. The surface area S1 of the first cavity 250 plus the surface area S2 of the second cavity 250 plus the surface area S3 of the third cavity 250 must not be less than 25 $cm^2$ and not more than 200 cm 2. Thus S=S1+S2+S3 and 25 $cm^2 \leq S \leq 200\ cm^2$.

Figure 3B:
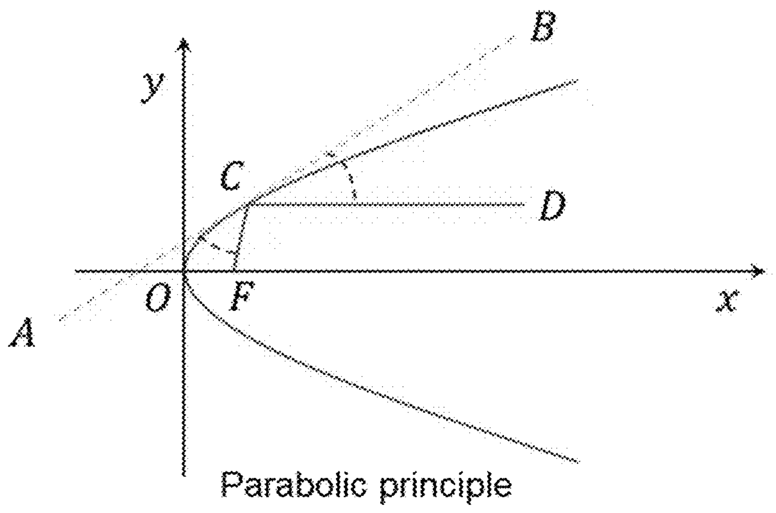
FIG. 3B is a graph illustrating the parabolic principle.
Figure 6:
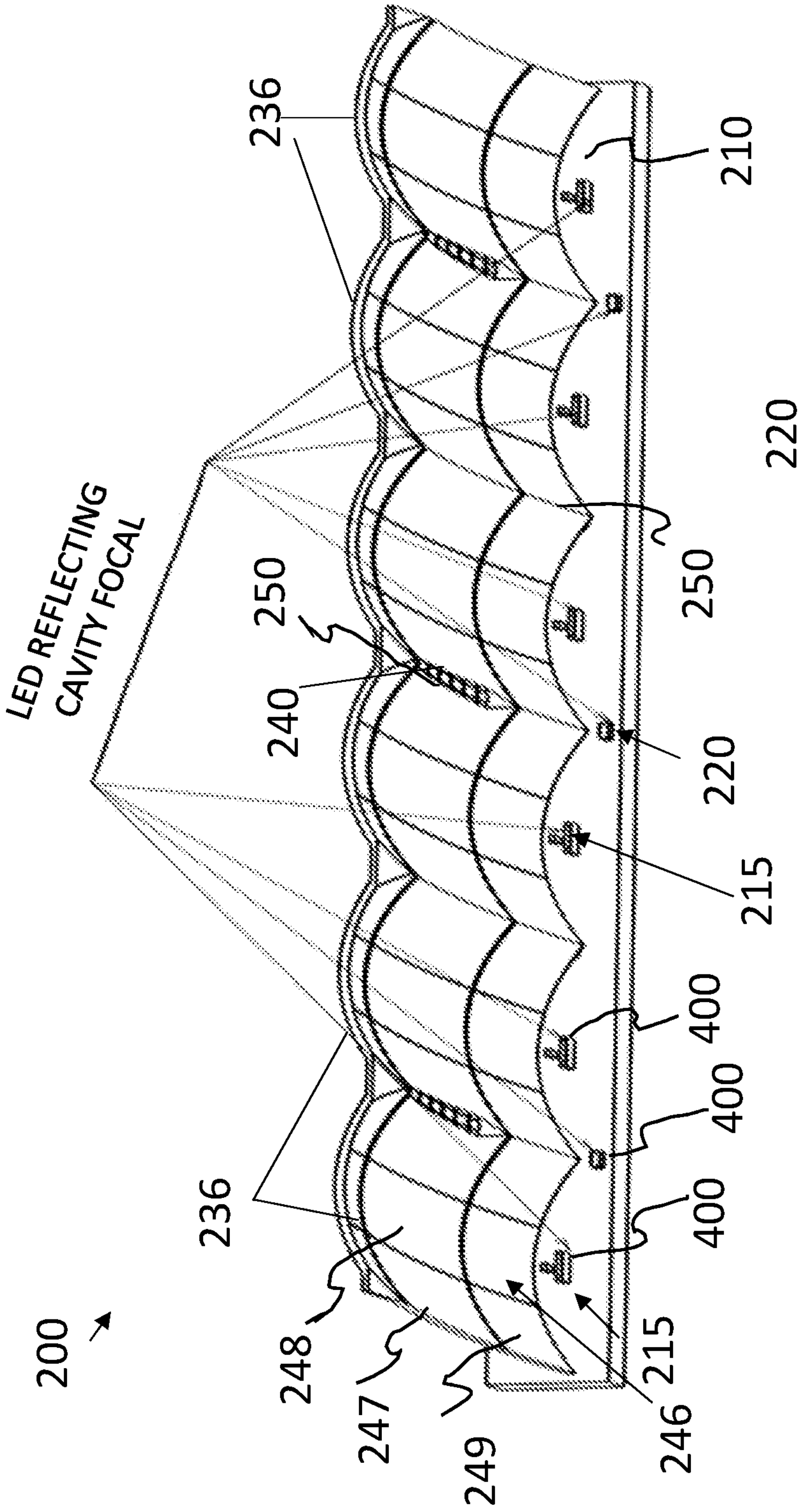
FIG. 6 is a perspective view of an optical assembly according to an example of the disclosure.

FIG. 6 is a perspective view of a lighting assembly 200 for a vehicle auxiliary lamp according to embodiments disclosed herein. As seen in FIG. 6 each reflective cavity 246 is formed to define a corresponding focal point. A center of each road illuminating LED light source 215 is positioned on PCB 210 in alignment with a focal point of a corresponding road-illuminating reflective cavity 246 in accordance with the optical principle of parabola (illustrated in FIG. 3B). Likewise, each light signaling LED light source 220 is positioned on PCB 210 in alignment with a focal point of a corresponding light signaling reflective cavity 250. This arrangement maximizes the light performance efficiency of LED light sources and the optical manifold when providing the road illumination and light-signaling functions.

Some example implementations provide both road illumination lighting functions and light signaling functions while meeting regulatory requirements. In embodiments, the free form surface of each reflective cavity 246 defines a paraboloid comprising a plurality of paraboloid surface areas (three indicated at 247, 248 and 249). Each paraboloid surface area is defined by a curvature radius. For a given regulatory requirement the curvature radius of each paraboloid surface area is adjusted so that the structure of the reflective cavity directs light from the corresponding LED module in a manner that meets the given regulation.

Figure 7:
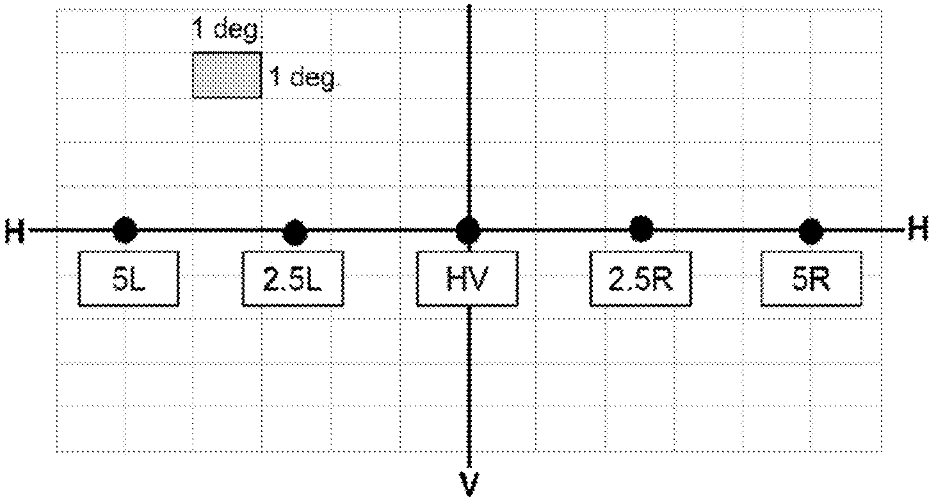
FIG. 7 is a graph illustrating a legally stipulated driving beam.
Figure 8:
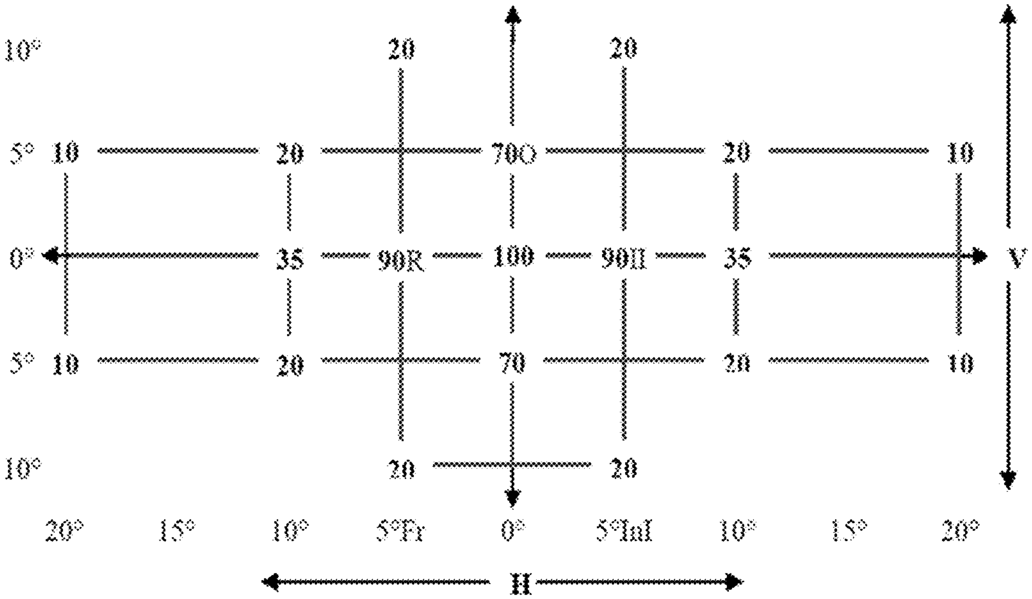
FIG. 8 is a graph illustrating a light signaling standard light distribution.

FIG. 7 is a graph of driving beam distribution requirement specified by ECE R149. FIG. 8 is a graph of light signaling distribution requirements specified by ECE R148. Referring to FIG. 6, the paraboloid surface areas such as shown at 247, 248 and 249 of road illuminating reflective cavities 246 of manifold 230 can be adjusted so that the driving beam distribution requirements of ECE R149 are met. The light signaling reflective cavities 250 can be adjusted so that the light-signaling light distribution requirements specified by ECE R418 are met. By configuring the each paraboloid surface area so that the reflected light is directed in accordance with the given regulation, headlamp assemblies specially configured and structured for particular geographic or regulatory markets can be provided.

What is claimed is:

1. A vehicular auxiliary lamp comprising:
- a housing;
- a lighting assembly disposed within the housing, the lighting assembly including:
  - a printed circuit board (PCB),
  - an optical manifold mounted on the PCB, the optical manifold comprising:
    - a plurality of road illuminating reflective cavities arranged adjacent one another along a length of the PCB, each one of the plurality of reflective cavities: defining a respective corresponding focal point, intersecting at least one other one of the plurality of reflective cavities at an intersection region, and having a bottom surface facing the PCB and a top surface opposite the bottom surface, and
    - a plurality of signaling reflectors, each of the plurality of light signaling reflectors being disposed over a top surface of the road illuminating reflective cavities at a respective one of the intersection regions,
  - a plurality of road illuminating light sources on the PCB with a center of each road illuminating light source aligned with the focal point of a respective corresponding road illuminating reflective cavity, and
  - a plurality of light signaling light sources with a center of each of the plurality of signaling light sources aligned with a focal point of a corresponding signaling reflector.

2. The vehicular lamp of claim 1 wherein each of the road illuminating cavities defines a paraboloid and comprises a plurality of curved surfaces, each curved surface defined by a radius of curvature selected such that light reflected from the road illuminating LED light source will be distributed in accordance with pre-determined light distribution requirement.

3. The vehicular lamp of claim 1 wherein the vehicular lamp provides road illuminating functions using light reflected from the road illuminating cavities, and also provides signaling functions using light reflected from the signaling ref lectors.

4. The vehicular lamp of claim 1 wherein a total surface area of the signaling reflectors is greater than or equal to 25 square centimeters and less than or equal to 200 square centimeters.

5. The vehicular lamp of claim 1 wherein a signaling reflector is formed at every other intersection region.

6. The vehicular lamp of claim 1 wherein a signaling reflector is formed at every intersection region.

7. A lighting assembly for a vehicle auxiliary light comprising:
- a printed circuit board;
- an optical manifold mounted on the printed circuit board, the optical manifold comprising:

a plurality of road illuminating reflective cavities arranged adjacent one another along a length of the printed circuit board, each one of the plurality of reflective cavities: defining a respective corresponding focal point, intersecting at least one other one of the plurality of reflective cavities at an intersection region, and having a bottom surface facing the PCB and a top surface opposite the bottom surface, and a plurality of signaling reflectors, each of the plurality of light signaling reflectors being disposed over a top surface of the road illuminating reflective cavities at a respective one of the intersection regions, a plurality of road illuminating light sources on the PCB with a center of each road illuminating light source aligned with the focal point of a respective corresponding road illuminating reflective cavity, and a plurality of light signaling light sources with a center of each of the plurality of signaling light sources aligned with a focal point of a corresponding signaling reflector.

8. The lighting assembly of claim 7 wherein each of the road-illuminating cavities defines a paraboloid and comprises a plurality of curved surfaces, each curved surface defined by a radius of curvature selected such that light reflected from the road illuminating LED light source will be distributed in accordance with pre-determined light distribution requirement.

9. The vehicular lamp of claim 7 wherein the vehicular lamp provides road illuminating functions using light reflected from the road illuminating reflective cavities, and also provides signaling functions using the signaling reflectors.

10. The vehicular lamp of claim 7 wherein a total surface area of the signaling reflectors is greater than or equal to 25 square centimeters and less than or equal to 200 square centimeters.

11. The lighting assembly of claim 7 wherein a signaling reflector is formed at every other intersection region.

12. The lighting assembly of claim 7 wherein a signaling reflector is formed at every intersection region.

* * * * *